July 29, 1969     M. B. LUCAS     3,458,377

METHOD OF FORMING TEAR TAPES ON PLASTIC PACKAGING MATERIAL

Filed Oct. 11, 1965

INVENTOR.
Malcolm B. Lucas

BY *Fredrick H. Braun*

ATTORNEY

United States Patent Office 3,458,377
Patented July 29, 1969

3,458,377
METHOD OF FORMING TEAR TAPES ON PLASTIC PACKAGING MATERIAL
Malcolm B. Lucas, Cincinnati, Ohio, assignor to The Procter & Gamble Company, Cincinnati, Ohio, a corporation of Ohio
Filed Oct. 11, 1965, Ser. No. 494,311
Int. Cl. B32b 7/06
U.S. Cl. 156—244                                    4 Claims

ABSTRACT OF THE DISCLOSURE

A plastic tear tape is applied to plastic packaging film by extruding a molten filament of plastic and depositing same upon the film in the form of a long narrow strip. One end of the extruded filament is supported out of contact with the film. The molten filament becomes bonded to the packaging film when it solidifies to form a tear tape there being a pull tab formed at the end which was supported out of contact with the film during solidification. Tear tapes may be applied in this fashion without affecting the physical properties of the packaging film material.

---

This invention relates to the art of plastic packaging and more particularly, to the provision of a tear tape for packages made from plastic packaging films and a method of attaching a tear tape to plastic films.

The formation of packages from plastic film materials such as polyethylene, polypropylene and the like, has become one of the most common methods for packaging articles to be sold in the retail market. In spite of the large volume of products that are sold in packages of this kind, the art has lacked a universally satisfactory tear tape device applicable to virtually any plastic packaging film material and one which can be applied at commercially feasible packaging machine speeds.

For example, it has been proposed to heat seal a tear tape to the outside surface of a package made from a plastic film material having thermoplastic properties. This type of tear tape is effective for grainless plastic films although it must be attached in a manner that tends to weaken and/or thin plastic packaging material. On the other hand, for grained plastic packaging material which is to be neither thinned nor weakened, the tear tape must necessarily be heat sealed substantially perpendicular to the grain orientation in the plastic packaging film. A further drawback to the heat sealing of tear tapes to a plastic packaging film is the fact that bonding by heat and pressure is a relatively slow process that is not easily adapted to high speed production methods as normally desired in present day commercial packaging operations.

It is, therefore, a principal object of this invention to overcome all of the above stated difficulties.

Another object of this invention is the provision of a tear tape for a plastic packaging film wherein the tear tape material is applied in a molten state to eliminate the need for handling and forming separate pre-formed tear tapes.

A further object of the invention is the provision of a tear tape for a plastic packaging film without affecting the strength or other physical characteristic of the packaging film and without making the placement of the finished tear tape critical with respect to the grain orientation of the film itself.

Still a further object of this invention is the provision of a method of applying tear tapes intermittently on a continuously moving web of plastic packaging material which may thereafter be cut into individual wrappers for use in the packaging of objects of various sizes and shapes.

The nature and substance of the invention may be summarized briefly as the provision of a plastic tear tape which is extruded as a molten filament and thereafter deposited on a film of plastic packaging material at intervals as the plastic packaging material is moved forward at a substantially steady rate. One end of the molten filament is supported so that it can not contact the film while still in molten condition. Thus, the molten filament becomes bonded to the plastic packaging film when it solidifies while the end which has been supported away from the film solidifies to form a pull tab. The tear tape is bonded to the packaging film without being embedded therein so that the physical properties of the plastic packaging film are substantially unaffected in an adverse manner in the area of the bond. The film may be cut and formed into individual wrappers which may be folded and sealed into a package containing one or more objects. Such packages are easily opened by merely grasping and pulling the pull tab whereupon the tear tape will initiate and cause tearing along the edges of the bonded seam to provide an opening in the package.

While the specification concludes with claims particularly pointing out and distinctly claiming the subject matter regarded as forming the present invention, it is believed the invention will be better understood from the following description taken in connection with the accompanying drawing in which:

In utilizing the present invention, it has been found practical to apply tear tapes continuously at spaced intervals to a web of plastic packaging film material prior to the formation of the film into a succession of individual packages. The invention has equal merit and utility, however, when the tear tapes are applied to individual wrapper sheets or even to finished packages. Nevertheless, the application of the tear tapes to a continuously moving plastic packaging film is considered of greater practical importance since this permits the bonding of tear tapes to the film at speeds in excess of 300 tear tapes per minute.

Figure 1:
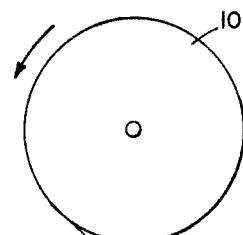
FIGURE 1 is a diagrammatic view of an apparatus for practicing the method of applying tear tapes at spaced intervals on a continuously moving plastic packaging film.

FIGURE 1 schematically illustrated the manner in which tear tapes can be formed and applied continuously at spaced intervals to a web of plastic packaging film material. A web of plastic film material is continuously withdrawn from the supply roll 10. The material on the supply roll 10 may be a plastic film such as polyethylene, polypropylene, polyvinyl chloride or any of the other plastic films which find widespread use in the packaging art. The web 11 is withdrawn from the supply roll 10 and led under the idler roll 12 to the rotating drum 13 wherein the tear tape material is applied. On leaving the drum 13, the web having tear tapes affixed thereto at spaced intervals passes over the idler roll 14 and thereafter between the driven pinch rolls 15 and 16.

A device for intermittently extruding a molten plastic filament is mounted over the rotating drum 13. This device consists of an extruder nozzle 17 which may be of the form shown in greater detail in U.S. Patent 3,008,862 issued to Walter A. Haine et al. on Nov. 14, 1961. The extruder nozzle 17 intermittently deposits a molten plastic bead or filament on the web 11. Preferably, the extruded bead or filament material is polyethylene although other well known plastic materials can be extruded in order to form an effective tear tape for a particular plastic packaging material. Polyethylene is preferred for the tear tape material when polyethylene is used for the packaging film material.

In the present invention the filament, e.g., polyethylene, is extruded intermittently from the nozzle 17 to form a series of tear tapes at spaced intervals on the film. This allows the plastic packaging film material to be cut into suitable lengths for wrapping and enclosing one or more articles that are to be packaged.

The filament is preferably extruded from a rectangular orifice. In a preferred embodiment the orifice is about 3/16" long x about 0.10" wide. The polyethylene filament material is preferably extruded at a pressure of from about 2000 p.s.i. to about 4000 p.s.i. The desired extrusion pressure will vary depending upon the surface speed of the plastic packaging film material. The temperature of extrusion is in a range from about 450° F. to about 550° F. In practice, the maximum temperature is limited by the nature of the plastic material being extruded. When operating within these limits, tear tapes are formed which are about 3/16" wide and from about .005" to about .015" thick. The dimensions of the orifice, the temperature and pressure of extrusion as well as the surface speed of the plastic packaging film material may all be varied in practice to obtain tear tapes of a given width and thickness.

In order to achieve intermittent extrusion, the nozzle 17 is provided with an internal plunger 18 which can be moved down by the actuating lever 19 to prevent flow from the nozzle 17. The lever 19 is in turn periodically moved by a constantly rotating cam 20 which acts on the cam follower 21, the latter being attached to the lever 19. A spring 22 is interposed between the nozzle 17 and flange 18a of the plunger 18 to maintain the follower 21 in contact with the cam 20. The cam 20 and rotating drum 13 are driven in timed sequence so that molten filaments of a predetermined length are intermittently deposited on the web 11 at predetermined spaced intervals. Each successive filament is in substantial alignment with each of the preceding filaments. While the plastic material extruded from the nozzle 17 is initially in a molten state, it solidifies and is bonded to the plastic packaging film after making contact therewith to form a tear tape.

Figure 2:
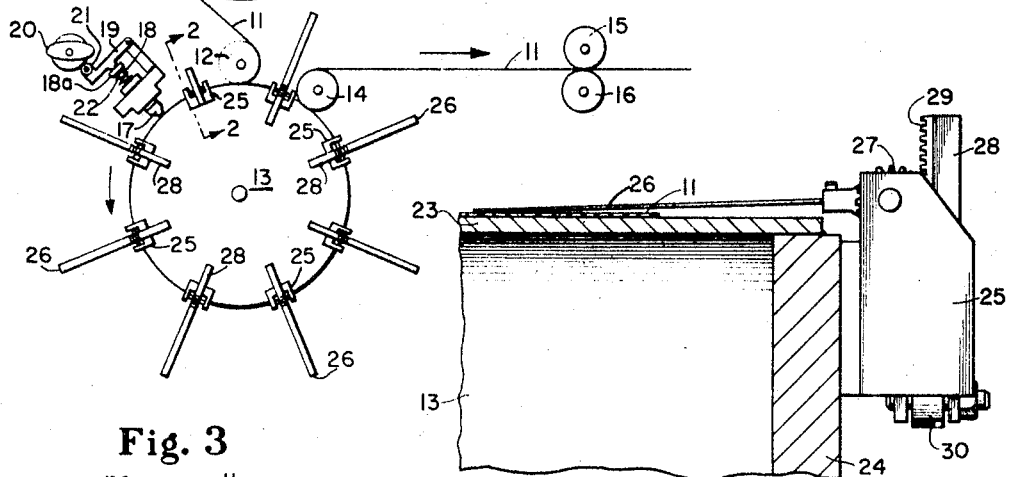
FIGURE 2 is a fragmentary cross section taken on the line 2—2 of FIGURE 1 showing some details of the mechanism used to support one end of the molten filament when it is extruded.

In order to provide a pull tab for each tear tape, a device as shown in FIGURES 1 and 2 may be used. Referring first to FIGURE 2, the drum 13 is shown including a cylindrical surface 23 and an end wall 24. A plurality of brackets 25 are mounted around the periphery of the drum 13. Finger members 26 are pivoted in the brackets 25. A pinion 27 is secured at one end of each finger member 26 on its pivot axis. A movable element 28 is assembled in the bracket 25 for vertical movement (as viewed in FIGURE 2) therein. One side of the element 28 has a rack 29 which engages the pinion 27. The lower end of each element 28 has a cam follower 30 attached as shown.

As the drum 13 rotates, the finger members 26 normally project radially outwardly due to the action of a cam (not shown) which pulls the elements 28 radially inwardly and thus pivots the finger members 26 to their inactive position. As each finger member 26 approaches the extruder nozzle 17, the corresponding movable element 28 is moved radially outwardly by a cam (not shown) acting on the follower 30 to pivot the finger member 26 into a position over the web 11 as shown in FIGURE 2.

The rotation of the drum 13 and cam 20 are timed so that extrusion of each molten filament is initiated just as each finger member 26 passes beneath the extruder nozzle 17. Thus the leading end of each new filament is deposited on a finger member 26 and is thus supported out of contact with the web 11. As the remaining molten material is extruded it is deposited on the web 11 beyond the finger member 26 to complete the tear tape. The temperature of extrusion is such as to form a simple and strong bond at the contact area of the molten filament and the plastic film material in a relatively short time interval. When the molten material has solidified, it is bonded to the plastic packaging film. The finger member 26 is then pivoted to its radially extending position by suitable cam means (not shown) acting on the cam follower 30. In order to achieve a quick bond and consequent high production rates, the drum 13 is preferably chilled by any conventional means. This, in turn, causes the bond between the molten filament and the plastic film material to be formed much more quickly.

Figure 3:
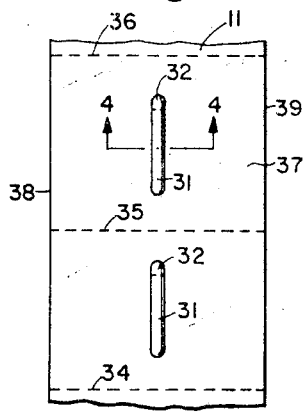
FIGURE 3 is a fragmentary view of a small portion of the plastic packaging film after a succession of tear tapes have been applied thereto at spaced intervals.
Figure 4:
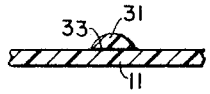
FIGURE 4 is a fragmentary cross section taken on the line of 4—4 of FIGURE 3 showing the molten filament bonded to the plastic packaging film to form a tear tape.

A portion of the completed plastic packaging film is shown in FIGURE 3. It will be noted that thermoplastic filaments of predetermined length have been bonded to the web 11 at intervals to form tear tapes 31 having a free end or pull tab 32 at the upper end. The cross section of the tear tape 31 and web 11 is best seen in FIGURE 4 wherein the tear tape 21 is shown bonded to the surface of the web 11 along the bonding area shown as a line 33 in FIGURE 4. It will be noted that the tear tape 31 is not embedded in the web 11. It has been found that the plastic web 11 is not weakened in the area immediately adjacent the tear tape 31 even though it has been subjected to high temperatures during the bonding operation. It has also been found that the orientation of the grain in the web 11 is immaterial to obtain a satisfactory tear tape. This is believed to stem from the fact that the application of a molten filament as previously described tends to cause heating in the area immediately adjoining the bonding area 33 to eliminate any grainy condition present in the film prior to the bonding of the tear tape thereto.

The plastic packaging web 11 having tear tapes 31 bonded thereto may be cut into suitable wrapper lengths as by cutting on the dotted lines 34, 35 and 36 of FIGURE 3. Thus, for example, the portion of film between the lines 35 and 36 will form an individual wrapper 37 having side edges 38 and 39.

Figure 5:
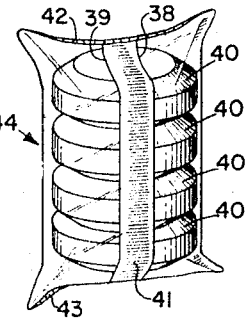
FIGURE 5 is a perspective view of a package made from a portion of the film of FIGURE 3.
Figure 6:
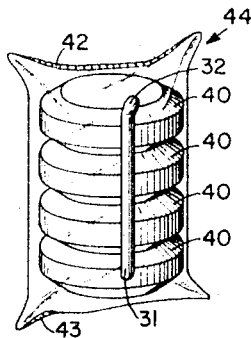
FIGURE 6 is a view similar to FIGURE 5 showing the obverse side of the package and the location of the tear tape.

The wrapper 37 may be formed into a package surrounding one or more articles as shown for example in FIGURES 5 and 6. In FIGURE 5, the wrapper 37 of FIGURE 3 has been formed around a plurality of objects 40 which, by way of example, are tablets of a detergent material such as Salvo® as manufactured by The Proctor & Gamble Company. The side edges 38 and 39 are overlapped and a vertical heat seal 41 is formed thereby forming a tube around the tablets 40. On forming the end seams 42 and 43, the package is completed in the form of a packet 44.

Figure 7:
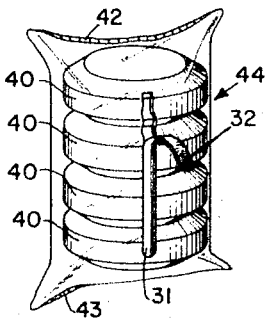
FIGURE 7 is a view similar to FIGURE 6 wherein the tear tape is shown after it has been pulled down to partially open the package.

On the side opposite to that shown in FIGURE 5, the tear tape 31 will be positioned substantially as shown in FIGURE 6. The pull tab 32 will be at the top of the packet 44. Opening may be initiated by pulling on the pull tab 32 and thereafter tearing open the film material after the tear tape 31 has initiated tearing as shown in FIGURE 7. Opening of the package may be completed by pulling down on the tear tape 31 until it is completely removed whereupon the tablets 40 can be removed with relative ease. The tear tape 31 is sufficiently strong to cause neat and true tearing of the plastic packaging material on both sides of the tear tape 31 to form a narrow slit in the wrapping material as defined by the side edges of the tear tape 31.

It has been found that a single polyethylene tear tape as described herein will function very effectively when bonded on polyethylene film material having a thickness of 3 mils or less. In fact, the present invention has been successfully practiced by bonding a tear tape on 2 mil polyethylene packaging material.

While particular embodiments of the invention have been illustrated and described, it will be obvious to those skilled in the art that various changes and modifications can be made without departing from the spirit and scope of the invention.

What is claimed is:

1. A method of forming a tear tape on a wrapper comprising the steps of feeding a sheet of plastic packaging material, depositing a molten plastic filament having a predetermined length on the surface of said plastic packaging material, supporting one end of said molten plastic filament to prevent it from contacting said plastic packaging material while said filament is in a molten state, permitting said molten plastic filament to solidify while in contact with the surface of the plastic packaging material without any substantial impression of the filament into the plastic packaging material thereby forming a tear tape on the surface of said plastic packaging material, said tear tape having a pull tab at the end which was supported while the filament was in a molten state.

2. A method of forming tear tapes on plastic packaging material comprising the steps of withdrawing a continuous web of plastic packaging material from a supply roll, depositing a succession of individual molten filaments of plastic material of predetermined length at spaced intervals on the surface of said plastic packaging film, supporting one end of each of said molten plastic filaments to prevent said ends from contacting said plastic packaging material while the filament is in a molten state, permitting said molten filaments to solidify while in surface contact with said plastic packaging material without any substantial impression of the filament into the plastic packaging material to form a plurality of tear tapes on said plastic packaging material, each of said tear tapes having a pull tab at the end which was supported while the filaments were in a molten state.

3. A method of forming tear tapes on plastic packaging film material as claimed in claim 2 wherein said plastic packaging film and said tear tape material are both polyethylene.

4. A method of forming a single tear tape on plastic packaging film material as claimed in claim 3 wherein said plastic packaging film is no greater than 3 mils thick.

References Cited

UNITED STATES PATENTS

| | | | |
|---|---|---|---|
| 2,554,160 | 5/1951 | Von Gunten | 156—306 X |
| 3,034,941 | 5/1962 | Hessenthaler et al. | 156—167 X |
| 3,088,379 | 5/1963 | Dickinson et al. | 93—1 |
| 3,098,601 | 7/1963 | Anderson et al. | 93—1 X |
| 3,239,402 | 3/1966 | Ecklund et al. | 156—244 X |
| 3,283,672 | 11/1966 | Mueller. | |

EARL M. BERGERT, Primary Examiner

T. R. SAVOIE, Assistant Examiner

U.S. Cl. X.R.

93—1; 156—302, 306; 229—66

PO-1050
(5/69)

UNITED STATES PATENT OFFICE
CERTIFICATE OF CORRECTION

Patent No. 3,458,377      Dated July 29, 1969

Inventor(s) Malcolm B. Lucas

It is certified that error appears in the above-identified patent and that said Letters Patent are hereby corrected as shown below:

Column 1, line 45, after "thin" insert -- the --. Column 4, line 32, the reference numeral "21" should read -- 31 --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents